Patented Sept. 30, 1924.

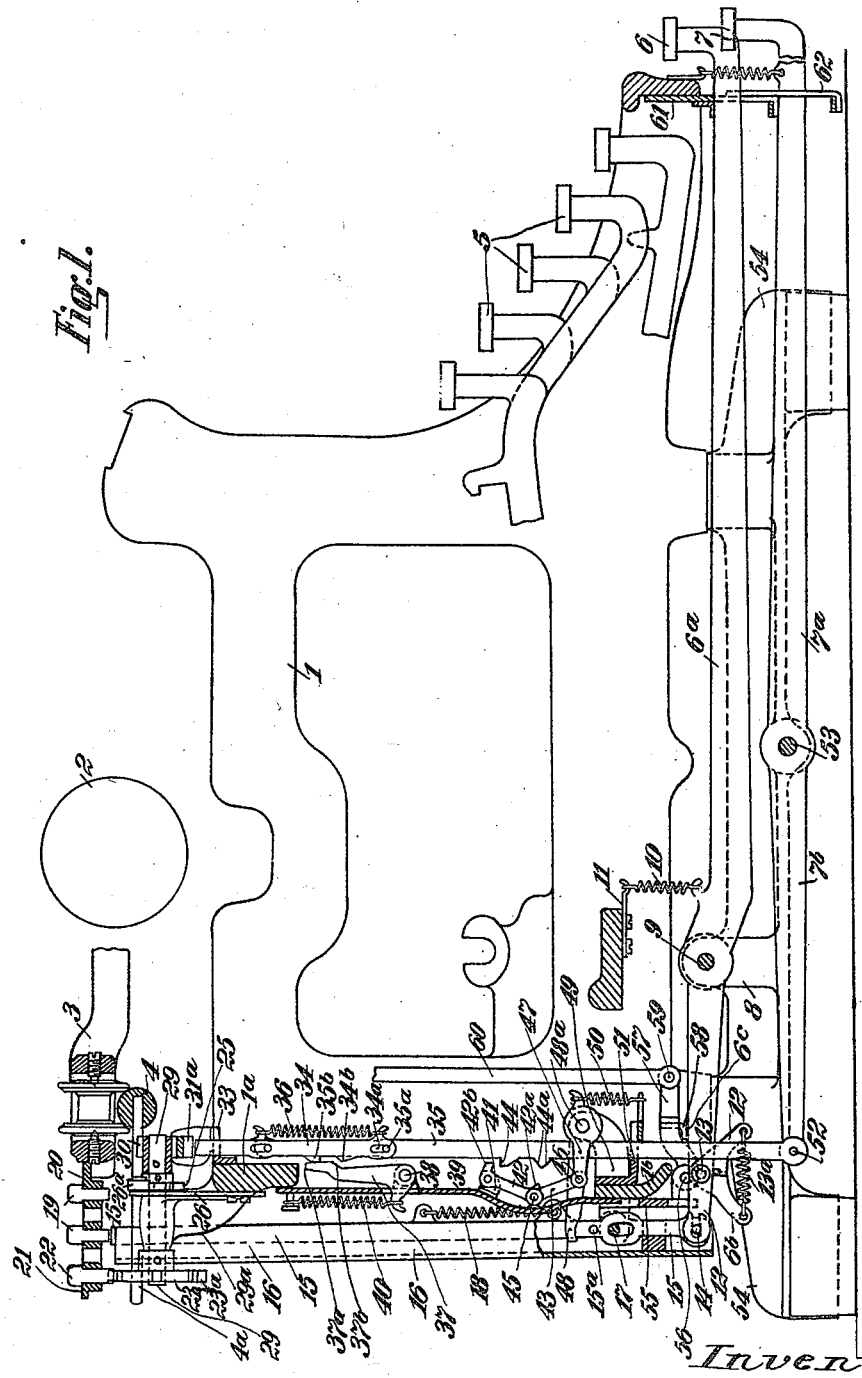

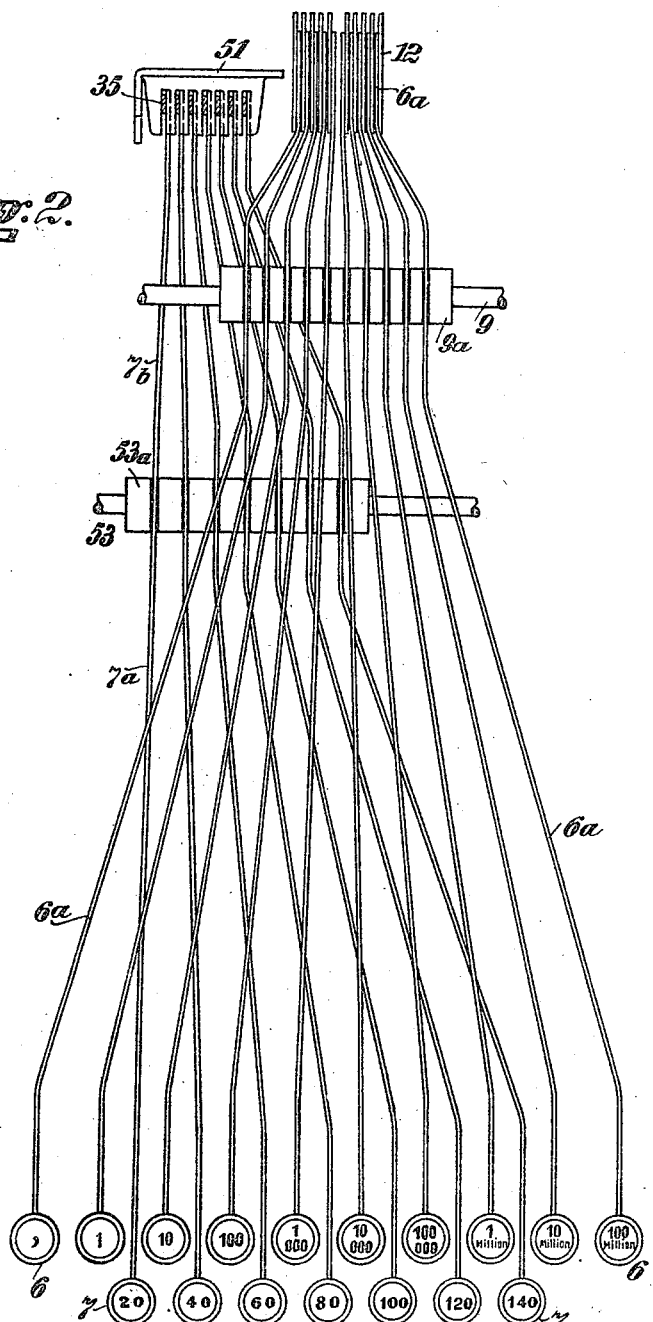

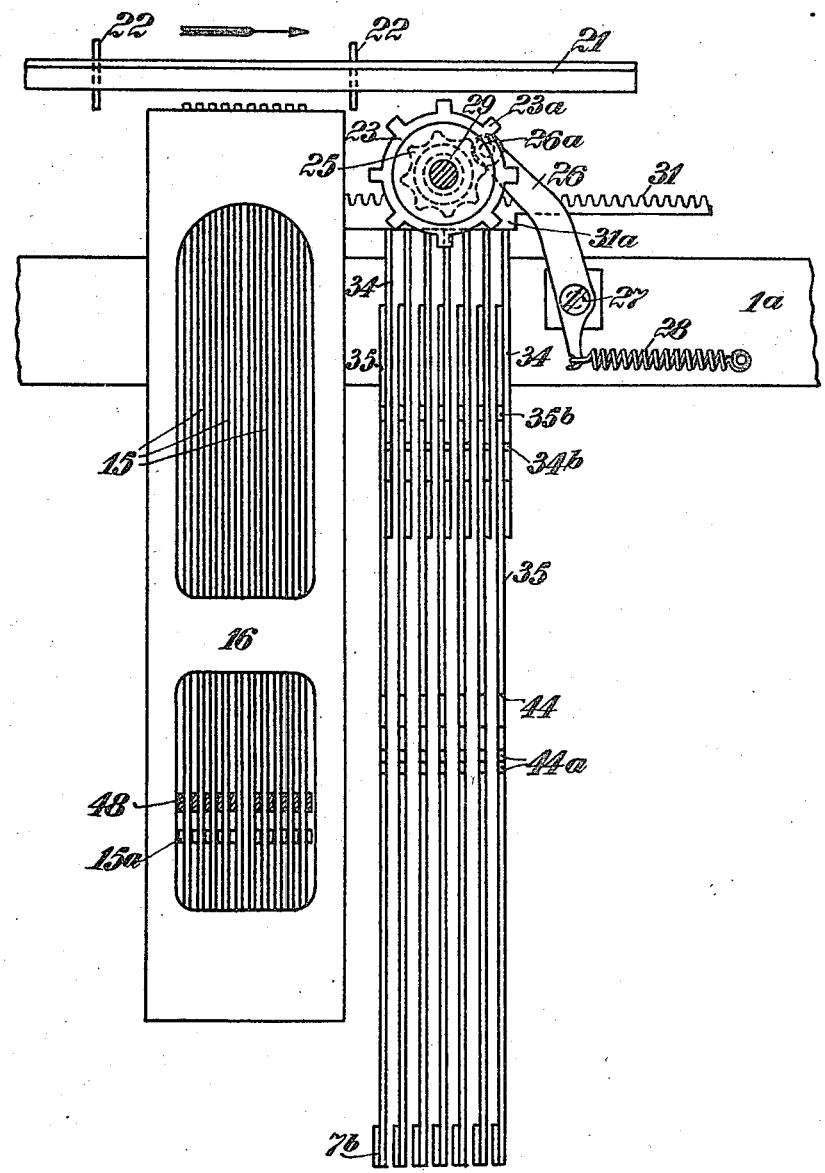

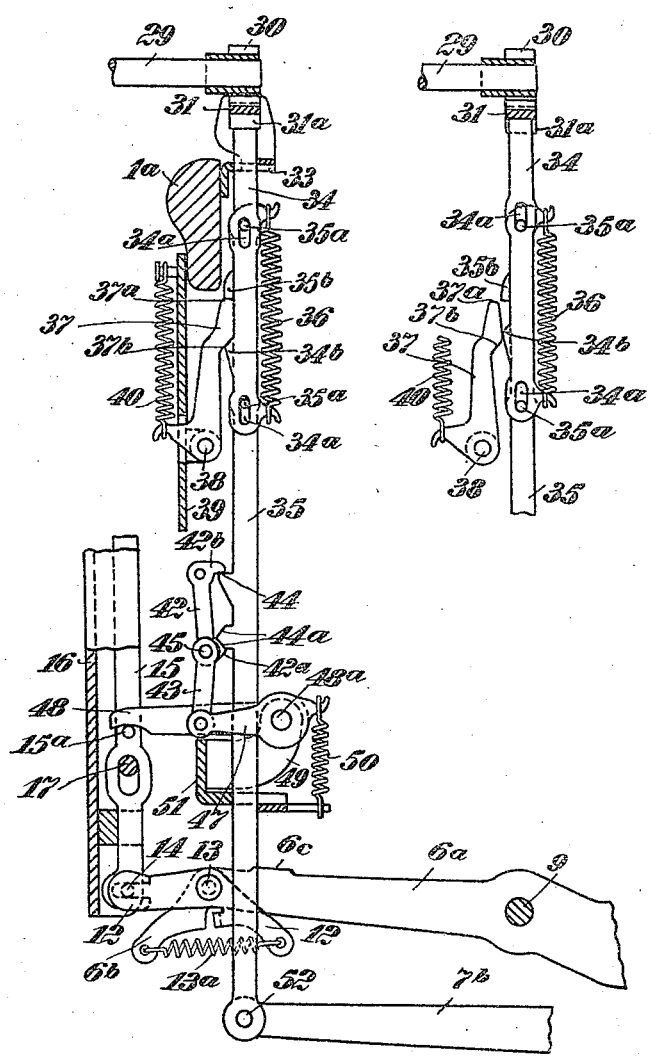

1,510,382

UNITED STATES PATENT OFFICE.

THEODOR EUGEN BÜSCHMANN, OF CHEMNITZ-KAPPEL, GERMANY, ASSIGNOR TO WANDERER-WERKE VORM. WINKLHOFER & JAENICKE AKTIENGESELLSCHAFT, OF SCHONAU, CHEMNITZ, GERMANY.

TABULATOR FOR TYPEWRITERS.

Application filed March 23, 1921. Serial No. 454,946.

(GRANTED UNDER THE PROVISIONS OF THE ACT OF MARCH 3, 1921, 41 STAT. L., 1313.)

*To all whom it may concern:*

Be it known that I, THEODOR EUGEN BÜSCHMANN, a citizen of the Realm of Germany, and residing at Haydnstrasse 9, Chemnitz-Kappel, Germany, have invented certain new and useful Improvements in Tabulators for Typewriters (for which I have filed an application in Germany August 24, 1914, Patent 290,911, dated March 29, 1916), of which the following is a specification.

This invention relates to tabulating devices for typewriters and has for its object to provide improved means for enabling the carriage to run to a predetermined letter space position in a determined column.

Tabulating devices for typewriters are known, comprising column selecting mechanism and denominational selecting mechanism combined in such a manner that by the operation of the column selecting mechanism, the carriage is allowed to slide to a determined column; and by the operation of the denominational selecting mechanism is allowed to slide to a determined place in the next column; and by the operation of the two selecting mechanisms, either simultaneously or one immediately after the other, permitting the carriage to run to a predetermined letter space position in a determined column.

The present invention, however, differs from the known constructions in that the known column selecting mechanism which, holds the carriage stationary at a determined column, is replaced by novel controlling means to prevent the denominational stops from coming into operation until the carriage has moved through a previously determined distance, whereupon then the respective denominational stop is released, and acts to stop the carriage at the previously selected letter space position in the desired column. This is the chief feature of the present invention. According to this invention the entire distance of the run of the carriage is divided into a plurality of sections, whose divisions may correspond to those of the columns, but not necessarily. The divisions are indicated by distance or column selecting stops which in the run of the carriage, act upon the means for controlling the denominational stops, in such a manner that after the passing of a previously determined column selecting stop, the said controlling means releases the denominational stops, so that by depressing one of the denominational keys the corresponding denominational stop comes into contact with the column stop following the column selecting stop, and halts the carriage.

A constructional form of the improved tabulator is illustrated by way of example in the accompanying drawings in which:—

Figure 1 is a side elevation.

Figure 2 a plan, and

Figure 3 a back view thereof.

Figures 4 and 4ª illustrate two different working positions of the locking apparatus for the denominational stops.

In the illustrated constructional example, 1 is the typewriter frame. The plates 2 are carried by the carriage 3 which runs by means of rollers on the guide rail 4 fixed to the frame 1. The type keys 5 serve for actuating the type levers or printing apparatus which is not shown as it does not belong to the invention.

Below the type keys there is provided a further row of keys required for operating the tabulating mechanism. The keys 6 are marked with the denominational values, as shown in plan (Fig. 2). The denominational key levers 6ª extend under the machine to the rear where they are terminated in the form of spring legs 6ᵇ. Each key lever has pivoted to it at 13 a bell crank lever 12. The spring 13ª draws this bell crank lever against the key lever spring leg 6ᵇ. On the bell crank levers 12 there are provided pins 14 engaging in the slots of the denominational stops 15 which are slidably mounted in a casing 16.

This casing is arranged to rock in the usual manner on the pivot-pin 17, and extends at the top through a plate 4ª. The rocking movement of the casing 16 serves to allow the denominational stops 15 to cooperate with different rows of column stops. The rocking mechanism is omitted in the drawings because the new apparatus is designed to be employed also when only one tabulator bar is provided, and the denominational stop casing is fixed to the frame of the machine.

The denominational stops 15 are raised by the denominational key levers 6ª, the member 12 and the pin 14, and pass thereby within the range of the column stops or sliders 19 which can be inserted in slots in the bars 20 at will, corresponding to the columns of the form to be written.

On depressing a denominational key 6, the paper carriage is disconnected in the known manner from the carriage-feed mechanism. The release of the carriage is effected by means of the rod 60 which is pivoted by means of a pin 59 to a bridge 57 mounted at 56. The universal bar 58 extends over all the denominational key levers 6ª which are formed with a prominence 6ᶜ at the point of engagement. Springs 18 attached to the denominational stops 15, and springs 10 mounted on the denominational key levers 6ª, which springs are suspended from a hooked bar 11, serve to bring the denominational stops out of the range of the column stops or sliders 19. The above is a description of the known apparatus wherein by pressing a denominational key, the carriage is released and moves forwards until the next column stop has come in contact with the denominational stop, and stops the further progression of the carriage. In this operation, in passing over a number of column stops, the respective denominational key must be struck each time until the desired column has been reached.

According to this invention the entire length of travel of the carriage is divided into a number of columns. A selecting apparatus is provided which allows the denominational stops to come into engagement with the column stops only after they have passed through the selected free columns. Consequently the denominational stops are locked in all the columns situated in front of the selected column. Only after the selected column has been reached, do the denominational stops become free, and the carriage is stopped by the first column stop situated in the selected column.

The selection of the columns is effected by means of sliders which correspond completely to the column stops, and subdivide the total travel length into any desired number of columns. For this purpose a bar 21 is further added corresponding to the column stop bars 20. The bar 21, like the rod 20, is formed with notches which are slotted according to the spacing of the letters. The stops 22 used for selecting the columns are inserted in the bar 21. In the movement of the carriage, the sliders 22 carry along with them the teeth 23ª of the selecting wheel 23. The selecting wheel 23 is mounted on the shaft 29 which is mounted in a bracket 29ª carried by the machine frame part 1ª. On the shaft 29 there is provided a disc 25 with indentations (Fig. 3) corresponding in number to the number of the teeth of the selecting wheel, a roller 26ª which is situated on the lever 26 being adapted to engage in the indentations of the disc 25 and assures the correct positioning of the selecting wheel 23. The lever 26 is fulcrumed at 27 on the machine frame and the roller 26ª is pressed by the spring 28 into the indentations of the disc 25. The selecting wheel 23 rotates a toothed wheel 30 which is fixed on the shaft 29 and which shifts the rack 31 (Figs. 1 and 4). On the underside of the rack there is a step 31ª the purpose of which is hereinafter described.

For selecting the desired column, column selecting keys are provided which are arranged in the example shown, under the denominational keys, but which might just as well be arranged laterally or in any other suitable position. These column selecting keys 7 are marked to indicate the columns in correspondence with the divisions of the carriage scale; they may however be otherwise indicated. The front end 7ª of the key lever is guided in a slotted plate 62. The key levers 7ª, 7ᵇ are fulcrumed at 53 and are secured laterally by "collars" 53ª (Fig. 2). The rear ends 7ᵇ of the key levers are connected by pins 52 to rods 35. At the tops of the rods 35 there are provided sliding members 34 formed with slots 34ª that are connected by pins 35ª to the rods. The sliding members 34 and rods 35 have each a spring 36 that has a tendency to pull them apart, or rather to push the members 34 upwards. The rods 35 have noses 35ᵇ and 44 and also a shoulder with an angled surface 44ª, the purpose of which is hereinafter described. On the part 1ᵇ of the frame there is provided a bearing 49 for the shaft 48ª on which the levers 47 are fixed. On the same shaft there are mounted levers 48 which extend between the denominational stops 15 (hatched in Fig. 3) and each terminates over a pin 15ª on the said stops. A lever 48 is provided for each denominational stop 15. Over all the column rods 35 there extends a bell crank lever-shaped part 42, 42ᵇ which is fulcrumed at 41 on the machine frame, and which is connected at 45 to the links 47 by means of two lateral links 43. The part 42, as well as the two lateral links 43, constitute together a toggle joint.

The hereinbefore described new apparatus operates as follows:—

In a typewriter the total travel of the carriage is subdivided, and in the illustrated constructional example the subdivision is such that the total travel comprises subdivisions or columns each of twenty letter spaces. Consequently the column selecting keys 7 are marked "20," "40," "60," etc. By pressing the desired column selecting key, for instance the one marked "100," the preparatory adjustment is effected without releasing the carriage. Only on depressing the desired denominational key, will the carriage move, and then it will move quite freely as far as the division marked "100" of the carriage scale, because the denominational stops 15 are kept depressed for that length of time. Only when the carriage has moved as far as the division marked "100" of the carriage scale, have the section stops 22 rotated the selecting wheel 23 to such an extent, and consequently shifted the rack 31 to such an extent as to release the denominational stops 15 which can then move into the path of the column stops 19. The first column stop 19 situated in the path now strikes the denominational stop 15, thereby stopping the carriage. This is effected as follows:—

On depressing the column selecting key 7 marked "100," the rod 35 that is connected to the lever $7^a$—$7^b$, is raised, its nose $35^b$ slides along one of the pawls 37 pivoted at 38, until the respective pawl engages with its end $37^a$; the springs 40 press the pawls 37 constantly against the rods 35. On raising the rod 35, the member 34 that is in slidable connection therewith, strikes the under surface of the rack 31, and is held back; the spring 36 is tensioned. At the same time the stop 44 comes into contact with the short leg $42^b$ of the part 42 and rotates the latter until it bends inwardly, so that the surface $42^a$ of the part 42 bears against the angle-shaped surface $44^a$ of the rod 35, because after the dead point has been passed, the spring 50 holds the toggle joint fast in its bent position (Fig. 4). The bending of this toggle joint imparts a downward rotation to the levers 48 situated between the denominational stops 15, because the toggle joint 45 cannot swing out so far to the right past the dead point (Fig. 4), as it is distant to the left of the dead point in the rest position (Fig. 1). The levers 48 are held fast in this their lower position. If now a denominational key 6 be depressed, the denominational stop 15 connected therewith cannot come into the range of action of the column stops 19, because the respective lever 48 keeps the denominational stop 15 down by means of its stud $15^a$. The depression of the denominational key levers $6^a$ alone is not hindered by reason of the spring connection $6^b$, 12, 13.

Fig. 4 illustrates the position of the parts when the denominational key is depressed and the column stop is locked. The spring $13^a$ of the spring connection is tensioned. The depression of a denominational key 6 has through the medium of the step $6^c$, universal bar 58, stirrup 57, pin 59 and rod 60, produces the result that the carriage feed mechanism releases the carriage, and the latter begins to run. In this operation the column stops 22 come in contact with the teeth $23^a$ of the selecting wheel 23 and each column stop rotates the selecting when one tooth further on. The step $31^a$ of the rack 31, on passing through a column stop 22, is always pushed further on by such an amount that it passes each time beyond a spring member 34. The spring member 34 determined by the column selecting key 7, bears with some pressure against the rack 31. As soon as the step $31^a$ of the rack 31 has passed beyond this spring member 34, the following takes place:—

The spring member 34 is shot upwards by the tensioned spring 36, and the nose $34^b$ situated thereon throws the pawl 37 back by means of the bevelled portion $37^b$. The upper end $37^a$ of the pawl now comes out of the range of the nose $35^b$, whereby the rod 35 loses its point of support. The position of the parts at this moment is shown in Fig. $4^a$. The rod 35 then falls down, whereby the angled surface $44^a$ slides down along the angled surface $42^a$ of the toggle lever, and bends the toggle joint back again. The spring 50, as well as the key pressure which tensions the spring $13^a$, and thereby presses the denominational stop pin $15^a$ against the lever 48, causes the toggle lever 42, 43 to "swing through." The denominational stop 15 which corresponds to the depressed denominational key 6, springs up and thereby comes into the path of the column stops 19. The first denominational stop 15 situated in the path will stop the run of the carriage.

In a determined position of the carriage only such sections can be kept free which must still be traversed, because a selecting key will operate only when the step of the rack has not yet passed beyond the respective member 34, because otherwise on depressing such a key, the nose $34^b$ situated on the spring member rises also, so that the nose $35^b$ is not able to catch the pawl 37 by its free end $37^a$.

In the new apparatus the column and the numerical placing may be selected at will without requiring any special combinations of sliders. All the sliders are simple and similar. The subdivision of the total travel can be divided at will into shorter or longer sections by suitable setting of the sliders 22. Column stops in any desired number may be set within the determined columns in order to form sub-columns.

The adjustability of the column stops gives a means of preventing a column stop from falling into a column. In such a case the respective column stop is simply set according to convenience in front or behind the column.

Having now described my invention, what

I claim as new and desire to secure by Letters Patent is:—

1. In tabulating mechanism for typewriters, a supporting bar fixedly mounted on the typewriter carriage and movable with said carriage, adjustable column stops and adjustable column selecting stops arranged on said bar, key operated denominational stops cooperating with the column stops to halt the movement of the carriage, column selecting bars, keys for actuating said column selecting bars, locking means for the denominational stops actuated by said column selecting bars, and means actuated by the column selecting stops for releasing said locking means.

2. In tabulating mechanism as claimed in claim 1, means for connecting the denominational keys to said denominational stops, said last mentioned means including key levers provided with arms, bell-crank levers mounted on the key levers, a spring connecting one arm of each bell-crank lever to the arm of the key lever on which the bell-crank lever is mounted, and means connecting the other arm of each bell-crank lever to the denominational stop with which it cooperates.

3. Tabulating mechanism as claimed in claim 1 in which each of the column selecting bars includes a lower member provided with a shoulder, an upper member provided with a shoulder connected to the lower member by a slot and pin connection, a spring for drawing the upper and lower members toward one another, and a spring pressed pivoted catch adapted to engage the shoulder of the lower member for holding the bar in raised position and to be engaged by the cam of the upper member for releasing the shoulder from the catch.

4. Tabulating mechanism as claimed in claim 1 in which the locking means includes a shoulder and a cam arranged on each column selecting bar, toggle links provided with projections to engage said shoulder and cam, a spring actuated lever connected to said toggle links, and pins on the denominational stops engageable with said levers.

5. In a tabulating mechanism for typewriters, denominational key levers, each provided with an arm, a bell-crank lever pivoted to each key-lever, a spring connecting a certain arm of each bell-crank lever to the arm of a key-lever, and denominational stops each connected to the arm of a bell-crank lever.

6. In tabulating mechanism for typewriters, a plurality of bars fixedly mounted on a typewriter carriage and provided with apertures, interchangeable pins mounted in the apertures of the bars, some of said pins forming column stops and others forming column selecting stops, a toothed disk actuated by the column selecting stops, a pinion driven by said disk, a rack driven by the pinion and provided with a cut away portion, key operated denominational stops cooperating with the column stops, column selecting bars cooperating with said rack, and locking means for the denominational stops actuated by said column selecting bars.

7. In tabulating mechanism for typewriters, column selecting bars and denominational stops, a shoulder on each of said column selecting bars, a bell-crank lever adapted to be struck by said shoulder and rocked when one of said bars is moved in one direction, a link connected to said bell-crank lever, a cam arranged at one end of the bell-crank lever, a second cam on the column selecting bar adapted to actuate the cam of the bell-crank lever, a lever actuated by said link, and a pin on one of the denominational stops adapted to be engaged by the last mentioned lever.

In testimony whereof I have signed my name to this specification.

THEODOR EUGEN BÜSCHMANN.

Witnesses:
OSCAR HOFMANN,
GEORG GABLER.